United States Patent [19]

Sado et al.

[11] 4,402,056

[45] Aug. 30, 1983

[54] ELECTRONIC DIGITAL MEMORANDUM

[75] Inventors: Ichiro Sado; Juji Kishimoto, both of Tokyo; Hiroshi Murata, Machida, all of Japan

[73] Assignee: Canon Kabushiki Kaisha, Tokyo, Japan

[21] Appl. No.: 261,965

[22] Filed: May 8, 1981

Related U.S. Application Data

[63] Continuation of Ser. No. 7,842, Jan. 30, 1979, abandoned.

[30] Foreign Application Priority Data

| | | | |
|---|---|---|---|
| Jan. 31, 1978 | [JP] | Japan | 53-9667 |
| Feb. 1, 1978 | [JP] | Japan | 53-10299 |
| Feb. 3, 1978 | [JP] | Japan | 53-11288 |
| Feb. 15, 1978 | [JP] | Japan | 53-16759 |
| Feb. 22, 1978 | [JP] | Japan | 53-22090[U] |
| Feb. 27, 1978 | [JP] | Japan | 53-21767 |
| Feb. 28, 1978 | [JP] | Japan | 53-25830[U] |
| Feb. 28, 1978 | [JP] | Japan | 53-25831[U] |
| Mar. 9, 1978 | [JP] | Japan | 53-27047 |

[51] Int. Cl.³ .................. G06F 15/20; G06F 3/14
[52] U.S. Cl. .................. 364/705; 364/709; 364/900
[58] Field of Search ............ 364/419, 705, 709, 900

[56] References Cited

U.S. PATENT DOCUMENTS

| | | | |
|---|---|---|---|
| 3,999,050 | 12/1976 | Pitroda | 364/705 |
| 4,007,443 | 2/1977 | Bromberg et al. | 364/900 |
| 4,106,101 | 8/1978 | Harrison | 364/709 |
| 4,115,870 | 9/1978 | Lowell | 364/900 |
| 4,117,542 | 9/1978 | Klausner et al. | 364/900 |
| 4,279,022 | 7/1981 | Abe | 364/900 |

*Primary Examiner*—Charles E. Atkinson
*Attorney, Agent, or Firm*—Fitzpatrick, Cella, Harper & Scinto

[57] ABSTRACT

A memorandum calculator is disclosed for performing arithmetic calculations on entered numeral information and generating information relating to the calculation, for storing data items consisting of address information entered as memory addresses and numerical information associated with the address information, and means for effecting performance of the arithmetic operation with respect to the numerical stored information according to input instructions.

5 Claims, 16 Drawing Figures

ELECTRONIC DIGITAL MEMORANDUM

This is a continuation of application Ser. No. 007,842, filed Jan. 30, 1979, now abandoned.

BACKGROUND OF THE INVENTION

1. Field of the Invention

The present invention relates to an electronic apparatus for memorizing information entered from input means.

2. Description of the Prior Art

With the recent remarkable reduction in power consumption of large-scale integrated circuits (LSI) employed in the electronic desk-top calculators or electronic memories, it has been rendered possible, as already disclosed in the U.S. Pat. No. 4,117,542, to store the results of calculations or the necessary data even in portable electronic apparatus. However such electronic apparatus are associated with the following drawbacks.

Such electronic apparatus, for example when carried in a pocket, may cause unexpected actuation of the keys by vibration or by contact with other items, which may result in the erasure of the memorized information.

Also with the recent compactization of electronic apparatus, particularly small desk-top calculators, there is generally employed a so-called second function input method wherein each input key represents plural meanings one of which is selected by the actuation of another particular key. For example a key standing for "sin" and "arcsin" is made to represent the latter after the actuation of another particular key. Also in a typewriter the number of keys is limited by differentiating, by means of a shift key, alphabets from numerals, or upper-case letters from lower-case letters.

In such input method, however, for entering paired data consisting of alphabets and numerals, for example data "SADO 0888" representing a person's name and his telephone number, it becomes necessary to actuate a specifying key for designating the meaning of each data entry key, and also to actuate the keys to designate the location of data storage in the memory.

Also such memories are usually designed to store multiple pairs of data, such as personal names and telephone numbers, and to release, upon input of either one of the paired data, the other one or both of the paired data as the output. In such apparatus the user tends to forget the content of the memorized data with the lapse of time and feels uneasy as to whether the necessary data are actually memorized in the apparatus.

Also in case of retrieving a person's name or a word by key input operation, it often happens that a memorized word cannot be located due to erroneous, excessive or deficient key actuations. For example a keyword "HASHI" stored in the memory cannot be retrieved if the input keys are deficiently actuated in the order of "H", "A", "S" and "I". Also a keyword "CANON" stored in the memory cannot be retrieved if the input keys are excessively actuated in the order of "C", "A", "N", "N", "O" and "N".

Also the electrically memorized paired data, for example a name of a merchandise and a unit price thereof, may require correction either at the entry thereof due to an error found in the entry operation or afterwords at a read-out due to an error found later. Correction keys, if provided for these cases, will not only complicate the structue of the apparatus but also may result in unexpected corrections due to possible erroneous actuations of said correction keys.

Also since the number of digits displayable on an electronic apparatus is generally limited in consideration of compactness, portability and cost, data of a digit number larger than the displayable digit number are usually not displayed or only partially displayed.

SUMMARY OF THE INVENTION

In consideration of the foregoing drawbacks, the object of the present invention is to provide an electronic apparatus capable of preventing the perturbation of the information stored therein resulting from unexpected key actuations. More specifically the present invention provides an electronic apparatus having selecting means capable, in a state wherein an electric power is supplied to said electronic apparatus, of forbidding key entry by plural key operations for entering numerals or symbols into said electronic apparatus.

Another object of the present invention is to provide a small electronic apparatus provided with means for designating another operating mode to the keys upon actuation of a particular key and also for designating a memory location to the data to be entered.

Still another object of the present invention is to provide a small electronic apparatus provided with input keys for entering information into said apparatus, a mode key for providing the information entered by said input keys with plural different meanings, and means adapted to function in response to the actuation of said mode key and to designate the memory address of the information to be entered by said input keys.

Also in consideration of the foregoing drawbacks, still another object of the present invention is to provide an electronic apparatus capable of checking, in advance, if necessary data are actually memorized.

Still another object of the present invention is to provide an electronic apparatus provided with a memory for storing data to be visually displayed, an address memory adapted to function in response to the actuation of a particular key and to modify the memorized content of address data for retrieving said data stored in said memory, address generating means for successively generating said address data of said memory in response to the actuation of said particular key, and means for visually displaying the data in said memory in response to the coincidence of the address generated by said address generating means with the content of said address memory.

Also in consideration of the foregoing drawbacks, still another object of the present invention is to provide a small electronic apparatus capable, when an input character code for the information to be retrieved does not coincide with the character codes corresponding to the information stored in the memory, of retrieving information of resembling the input character codes.

Still another object of the present invention is to provide a small electronic apparatus storing plural alphabet codes in a read-only memory or a read-write memory such as a register or a random-access memory and capable, in a data retrieval of an alphabet code coinciding with a code entered by alphabet input keys, of performing a control of retrieving alphabet codes resembling the entered code if such coincidence is not achieved.

Still another object of the present invention is to provide a small electronic apparatus provided with a memory for storing a plurality of information to be retrieved, first control means for retrieving information from said memory corresponding to information entered from input means, second control means for retrieving information from said memory approximately corresponding to said information for retrieval entered from said input means, and means for activating said second control means when said information to be retrieved corresponding to said information is not available by said first control means.

Still another object of the present invention is to provide an electronic apparatus provided, in addition to arithmetic calculating functions of an electronic tabletop calculator, with a memory function of an arbitrary content such as personal names and corresponding telephone numbers or bank account numbers and corresponding deposited amounts.

Still another object of the present invention is to provide an electronic apparatus provided with an input unit for entering characters, numerals and instructions, a processing unit for conducting arithmetic processing according to the instructions entered from said input unit, a memory unit for storing characters and numerals in pairs, and control means for causing said processing unit to process said numerals stored in said memory unit according to said instructions entered from said input unit.

Further in consideration of the foregoing drawbacks, still another object of the present invention is to provide an electronic apparatus capable, at the data input or output, of identifying the state thereof and correcting the input or output information, and, at a state of inspecting erroneous storage in the memory, of identifying the state of storage and erasing erroneously stored information.

Still another object of the present invention is to provide a small electronic apparatus provided with detecting means for detecting two different states, and means for determining, in response to said detecting means and upon actuation of a particular key, whether to modify the displayed content or to modify the content in the memory other than the displayed content.

Further in consideration of the foregoing drawbacks, still another object of the present invention is to provide an electronic apparatus capable of displaying the entire output information.

Still another object of the present invention is to provide an electronic apparatus capable of displaying output information in plural divided displays with an indication that said displays are divided displays.

Still another object of the present invention is to provide an electronic apparatus provided with a display device of plural digits, a register for storing information and having digits of a number in excess of that of digits of said display device, comparing means for comparing the number of digits of information stored in said register with the number of digits of said display device, and means functioning in response to said comparing means when the number of digits of information stored in said register is in excess of that of said display device and causing an indication that the information in said register is dividedly displayed.

Still another object of the present invention is to provide an electronic apparatus provided with a memory for storing time data and a content corresponding thereto, a time-measuring unit for releasing time-measuring data, address means for releasing addresses of said memory, a comparing circuit for comparing said time data stored in said memory and released by said address means with said time-measuring data from said time-measuring unit, a timer for releasing a signal for a determined period in response to a coincidence output signal from said comparing circuit, and means for visually displaying said content stored in said memory in response to said signal from said timer.

Still other objects of the present invention will be made apparent from the following description of the preferred embodiments thereof taken in conjunction with the attached drawings.

DESCRIPTION OF THE PREFERRED EMBODIMENTS

Figure 1:
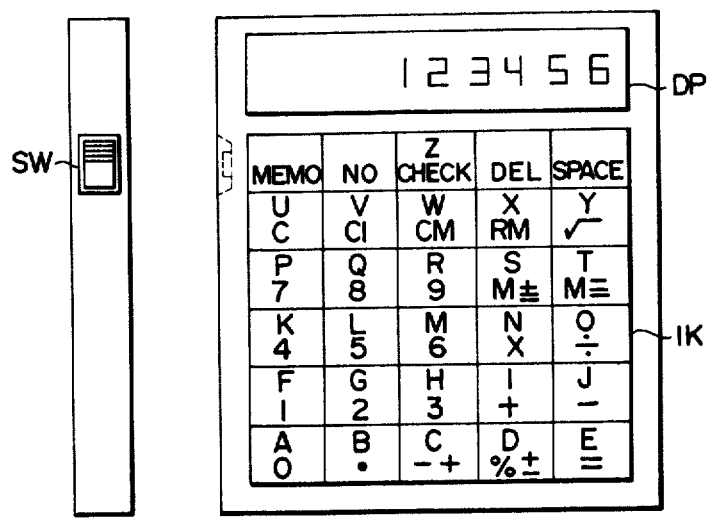
FIG. 1 is an external view of an apparatus embodying the present invention.

Referring to FIG. 1 illustrating the electronic apparatus embodying the present invention in an external view, there are shown an input keyboard IK for entering numerals, symbols, instructions etc. into said apparatus, a display unit DP for transmitting the information to the user of the apparatus, and a switch SW for disabling said input keyboard IK.

Figure 2:
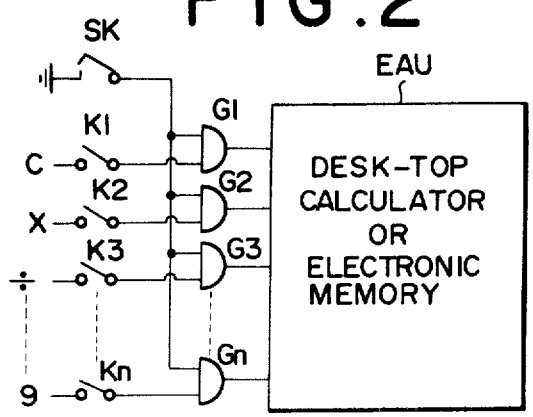
FIG. 2 is a wiring diagram thereof.

FIG. 2 shows the wiring of the input keyboard IK and the switch SW shown in FIG. 1, wherein there are shown keys K1-Kn which are arranged in said keyboard shown in FIG. 1 and are respectively connected gates G1-Gn, and a switch SK of which output is supplied to the other input terminals of said gates G1-Gn, of which outputs are supplied to an electronic arithmetic unit EAU such as an electronic desk-top calculator or an electronic memory unit.

In this embodiment, upon closure of the switch SK, the signal entry from the keys K1-Kn to the electronic arithmetic unit EAU is forbidden. In this manner said unit EAU maintains the stored data, without eventual perturbation resulting from unexpected actuation of the keys K1-Kn.

It is to be noted that said switch SK (or SW) is located in a recessed portion on the side wall of the apparatus as shown in FIG. 1 in order to avoid actuation by vibration or unexpected contact. Thus the data stored in the electronic apparatus can be safely protected as long as said switch is closed, even if the keys positioned on the front face of the apparatus are accidentally pressed for example in a pocket of clothing.

Though in FIG. 2 said gates G1-Gn are provided on all the keys K1-Kn, it will be naturally understood that the above-mentioned purpose can be achieved if gates are provided only on the keys relating to the data memory.

In the following explained is an embodiment allowing entry with simplified key operations of memorandum information to be stored in the electronic apparatus.

Figure 3:
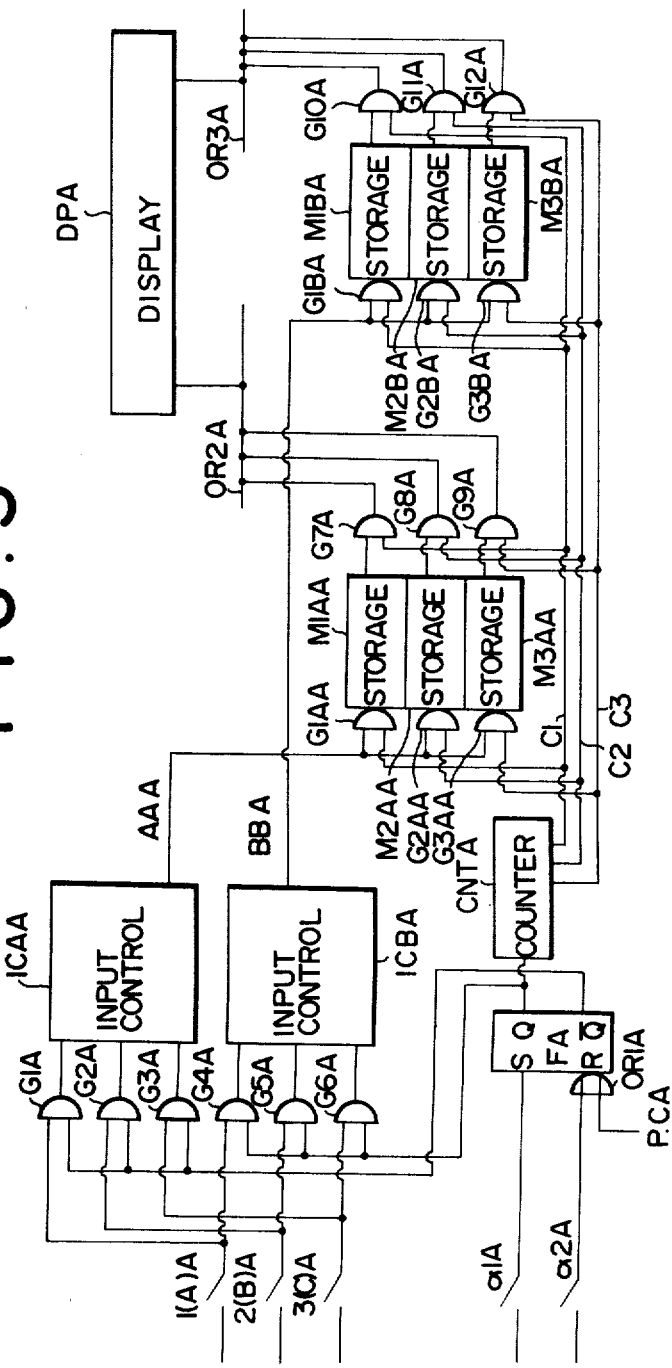
FIG. 3 is a block diagram of an embodiment of the present invention.

Referring to FIG. 3 showing a block diagram of an embodiment of the present invention, there are shown keys 1(A)A, 2(B)A and 3(C)A for entering numerals or alphabets;

mode keys $\alpha 1$, $\alpha 2$ which select the entry of either numerals or alphabets by said keys 1(A)A, 2(B)A and 3(C)A;

an input control unit ICAA which generates key codes for numerals in response to the signals from said keys 1(A)A, 2(B)A and 3(C)A entered through AND gates C1A, G2A and G3A which are controlled by a signal from a flip-flop FA;

an input control unit ICBA which generates key codes for alphabets in response to the signals from said keys 1(A)A, 2(B)A and 3(C)A entered through AND gates G4A, G5A and G6A which are controlled by a signal from said flip-flop FA;

a counter CntA which changes the content thereof upon each setting of the flip-flop FA, wherein said content being utilized as the address signal for the memory to be explained later, and said counter CntA being adapted in this embodiment to assume three states of "1", "2" and "3" starting from an initial state of "3" and in the cyclic order of 3, 1, 2, 3, ... in response to the set signals of the flip-flop FA;

memories M1AA, M2AA and M3AA respectively paired with memories M1BA, M2BA and M3BA, said memories being adapted to memorize the output signals from said input control units ICAA, ICBA supplied through the signal lines AAA, BBA and through AND gates G1AA, G1BA; G2AA, G2BA or G3AA, G3BA respectively controlled by the signals through the signal line C1A, C2A or C3A when said counter CntA assumes a state "1", "2" or "3";

a display unit DPA comprising display elements, a decoder, a memory etc., said memory being adapted to receive the content of memories M1AA-M3AA, M1BA-M3BA through AND gates G7A-G9A and G10A-G12A and OR gates OR2A, OR3A; and an OR gate OR1A receiving at an input terminal thereof a power-up clear signal PCA for resetting said flip-flop FA and at the other input terminal thereof an output signal from said mode key $\alpha 2$.

The embodiment structured as explained above functions in the following manner.

For example in case of entering data "ABC123" into the apparatus, the key $\alpha 1$ is at first actuated to set the flip-flop FA of which output signal shifts the counter CntA to the state "1", whereby a signal is released through the signal line CI for opening the AND gates G1AA, G1BA.

The set signal from said flip-flop FA also opens the AND gates G4A, G5A and G6A to enable entry of alphabets by the keys 1(A)A, 2(B)A and 3(C)A.

It is also possible to supply said set signal Q of the flip-flop FA for informing the operator of the key input mode.

Upon subsequent actuation of the key 1(A)A, the output signal thereof is supplied through the gate G4A opened by said output signal Q of the flip-flop FA to the input control unit ICBA to generate a code signal corresponding to the character "A", which is entered into the memory M1BA through the AND gate G1BA. Upon successive actuations of the keys 2(B)A and 3(C)A, the code signals corresponding to "B" and "C" are entered in a similar manner into said memory M1BA.

Then the mode key $\alpha 2$ is actuated to reset the flip-flop FA, thereby closing the AND gates G4A, G5A and G6A.

Upon subsequent actuations of the keys 1(A)A, 2(B)A and 3(C)A in this order, the respective output signals therefrom are supplied through the AND gates G1A, G2A and G3A now opened by the signal $\overline{Q}$ of the flip-flop FA to the input control unit ICAA to generate code signals corresponding to numerals which are memorized in the memory M1AA through the AND gate G1AA in the order of generation.

Then when the mode keys $\alpha 1$, $\alpha 2$ are actuated for entering for example data "BBC123", the flip-flop FA is set and the counter CntA is shifted to a state "2" thereby changing the memory address for said data "BBC123". The code signals corresponding to said data are generated in the above-explained manner, and the data "BBC" and "123" are respectively memorized in the memories M2BA and M2AA through the AND gates G2BA and G2AA.

The contents of said memories can be easily displayed on the display unit by connecting the output of desired memory to said display unit according to the instruction by the mode keys.

As explained in the foregoing, the small electronic apparatus of the present invention enables simpler key entry operations since the location of storage of input data can be designated in response to the operation of mode instruction keys designating the meanings of the input keys.

In the following there will be given an explanation on the method of retrieving the information stored in the electronic apparatus of the present invention.

Figure 4:
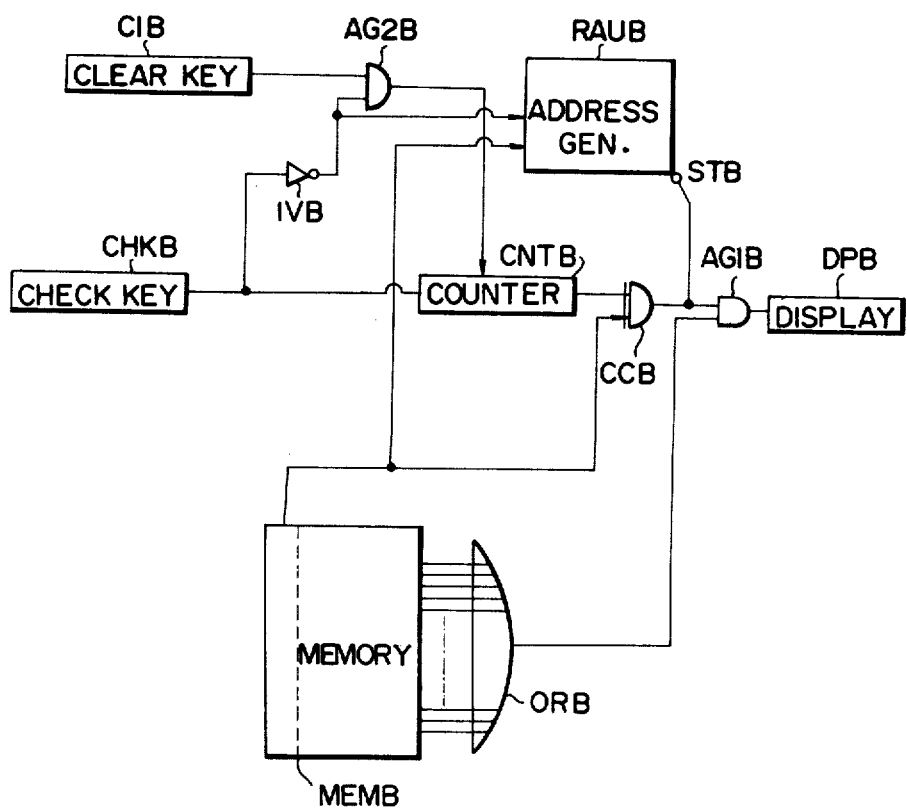
FIG. 4 is a logic block diagram of an embodiment of the present invention.

Now referring to FIG. 4 showing a block diagram of an embodiment of the present invention, there are shown a check key CHKB to be actuated in case of confirming the presence of a necessary stored data;

a counter CntB which is step advanced for example by "1" in response to each actuation of said check key CHKB, wherein said advancement may be achieved by means of an adding circuit;

a read address generator unit RAUB which is activated by said check key CHKB to generate memory addresses in succession;

a coincidence circuit CCB which compares the content of said counter CntB with the signal from said read address generator RAUB and, in case of coincidence, generates a coincidence signal which terminates the address output from said read address generator RAUB;

a memory MEMB storing paired data at an address designated by said counter CntB or by said read address generator RAUB, said data being entered for example through a keyboard;

an OR gate ORB receiving the content of said memory MEMB;

an AND gate AG1B which is opened by the coincidence signal from said coincidence circuit CCB to transmit the content of said memory MEMB through said OR gate ORB to a display unit DPB;

an inverter IVB receiving the signal from said check key CHKB and supplying an inverted signal to an AND gate AG2B; and a clear key CIB of which output signal is supplied to said AND gate AG2B and further supplied, when the check key CHKB is not actuated, to the counter CntB to clear the content thereof.

The embodiment structured as explained in the foregoing functions in the following manner.

Upon actuation of the check key CHKB for confirming the presence of data stored in the memory MEMB, the counter CntB is step advanced from an initial state "0" for example to "1".

The signal from said check key CHKB is also supplied, through the inverter IVB, to the read address generator RAUB which thus generates the address data of the memory MEMB in succession.

The coincidence circuit CCB compares the content "1" of said counter CntB with the signal from said read address generator RAUB, which continues to release the address data in succession until said signal becomes equal to said content "1".

When the signal from said read address generator RAUB becomes equal to "1", the coincidence circuit CCB generates a coincidence signal which is supplied to a terminal STB to suspend the function of the read address generator RAUB in a state of releasing address data "1". Consequently the paired data, for example "CANON758-2111", stored in the address "1" of the memory MEMB are released through the OR gate ORB and through the AND gate AG1B opened by the coincidence signal from said coincidence circuit CCB and displayed on the display unit DPB.

Upon repeated actuation of the check key CHKB, the content of the counter CntB is step advanced to "2" and the read address generator RAUB restarts the output of address data in succession until a coincidence signal is obtained from the coincidence circuit CCB in the manner as explained above.

In this manner the above-explained procedure is repeated upon each actuation of the check key CHKB to display paired data, thereby enabling the operator to confirm the contents of the stored data.

In case the clear key CIB is actuated to erase the content displayed on the display unit DPB, the signal from said clear key is supplied through the AND gate AG2B, which is now opened by the high-level signal from the inverter IVB as the check key CHKB is not actuated in this state, to the counter CntB to clear the content thereof. In this manner the coincidence circuit CCB terminates the output of coincidence signal, whereby the paired data are no longer supplied to the display unit DPB.

Although a coincidence circuit is employed in the foregoing embodiment, it is also possible within the scope of the present invention to etrieve the stored data by connecting the counter directly with the address of the memory. It is likewise possible to achieve the resetting of the counter by means of an output of another control circuit.

As explained in the foregoing, the present invention enables checking the contents of stored data by a simple operation solely with a check key.

In the following there will be explained an embodiment enabling, in the retrieval of the memorandum information stored in the apparatus, the finding of correct information by similar input information.

Figure 5:
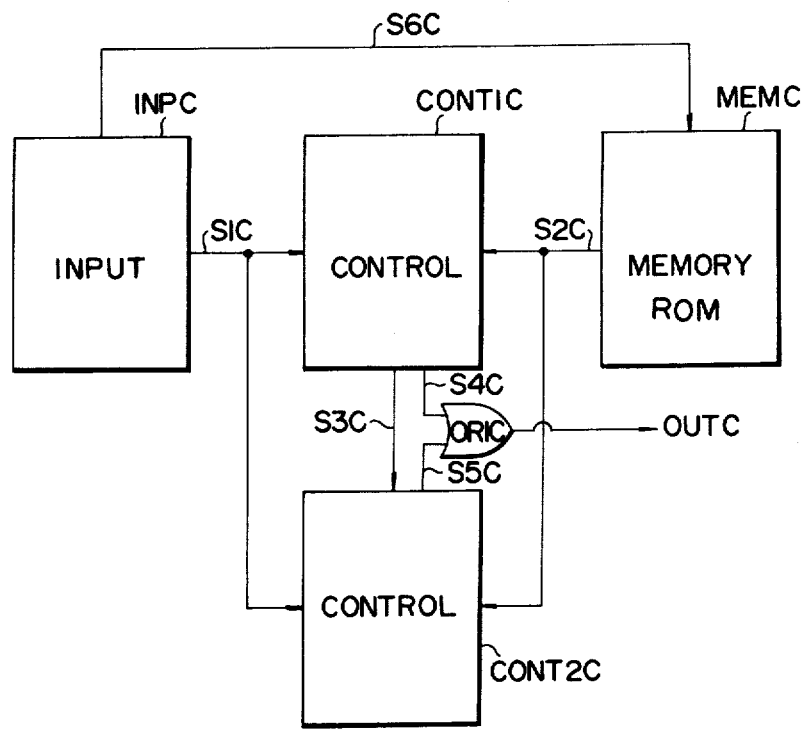
FIG. 5 is a block diagram of an embodiment of the present invention.

Referring to FIG. 5 showing a block diagram of an embodiment of the present invention, there are shown an input unit INPC comprising a key group consisting of input keys for numerals and alphabets, a read key etc., an encoder for generating key codes in response to the actuation of said keys and an input buffer for temporarily storing the output of said encoder, said input unit being adapted to release the content of said input buffer and to send a read start instruction signal to a memory unit to be explained later in response to the actuation of said read key;

a memory unit MEMC storing plural alphabetic codes in advance and capable of repeatedly releasing the stored contents in succession upon receipt of a signal from said input unit INPC;

a control unit CONTIC having a comparing function and being adapted to compare the outputs from said memory unit MEMC with the output of said input buffer of the input unit INPC and to send said output through an OR gate OR1C in case of coincidence or to supply a signal to a control unit CONT2C to be explained later in case of absence of coincidence; and a control unit CONT2C for detecting resembling codes adapted to identify input code misspelled in, superfluous by or deficient by one letter entered from the input unit INPC and to supply such code from the other input terminal of the OR gate OR1C thereby supplying the coinciding code to other control unit and display unit.

Figure 6:
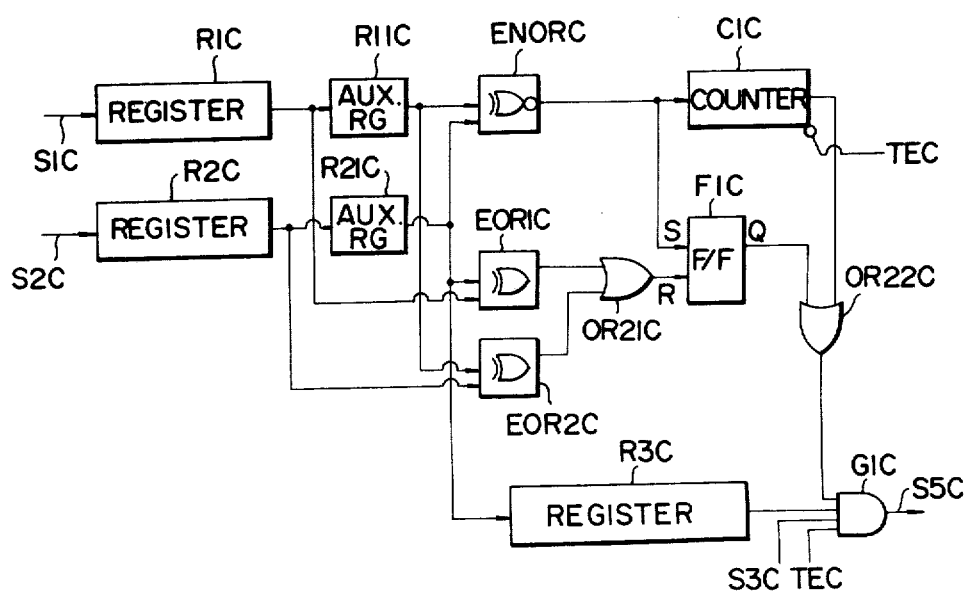
FIG. 6 is a detailed block diagram of a control unit CONT2 shown in FIG. 5.

FIG. 6 is a block diagram of an embodiment of said control unit CONT2C, wherein there are shown:

a register R1C for storing key codes received from the input unit INPC through a signal line S1C;

an auxiliary register R11C for storing information of a character received from said register R1C, whereby a word, a sentence or a character is stored by the combination of said register R1C and auxiliary register R11C;

a register R2C for storing an item in said memory unit MEMC;

an auxiliary register R21C for storing an item in said memory unit MEMC in combination with said register R2C;

a register R3C for receiving and redelaying the output from said auxiliary register R21C;

an uncoincidence detector ENORC adapted to compare the output from the auxiliary register R11C with that from the auxiliary register R21C and to release a signal "1" in the absence of coincidence;

a coincidence detector EOR1 adapted to compare the output from the auxiliary register R21C with that from the register R1C and to release a signal "1" in case of coincidence;

a coincidence detector EOR2 adapted to compare the output from the auxiliary register R11C with that from the register R2C and to release a signal "1" in case of coincidence;

an OR gate OR21C for transmitting the output signals from said coincidence detectors EOR1C, EOR2C;

a flip-flop F1C adapted to be set by the output signal "1" from said uncoincidence detector ENORC and reset by the output signal "0" from the OR gate OR21C;

an n-cyclic counter C1C for counting the output signals "1" from the uncoincidence detector ENORC and releasing an output signal when the counted number of uncoincidences reaches a predetermined number equal to the number of resembling codes (in the present embodiment all the codes mistaken by one character are regarded as resembling codes), said counter C1C being reset by a timing pulse TEC upon completion or comparison of each one item;

an OR gate OR22C receiving the positive output from said flip-flop F1C and the output from said counter C1C;

an AND gate G1C receiving signals from the OR gate OR 22C, register R3C and signal line S3C and the timing pulses TEC;

a signal line S1C for supplying the character codes from the input buffer in the input unit INPC to the control units CONT1C and CONT2C;

a signal line S2C for supplying the data stored in the memory unit MEMC to said control units CONT1C and CONT2C;

a signal line S3C for supplying the output signal released by the control unit CONT1C upon absence of coincidence in the comparison conducted therein to the control unit CONT2C;

a signal line S4C for supplying the retrieved information to the OR gate OR1C when the control unit CONT1C identifies the coincidence of the input data from the input unit INPC with a stored data in the memory unit MEMC;

a signal line S5C for supplying the retrieved information from the memory unit MEMC to the OR gate OR1C in case the comparison of the input data from the input unit INPC with the stored data in the memory unit MEMC conducted in said control unit CONT2C results in a manner to be explained later; and a signal line S6C for supplying the read start instruction signal from the input unit INPC to the memory unit MEMC.

The function of the above-explained embodiment is now explained in the following. It is assumed that the stored information coinciding with the key input information has not been found in the comparison conducted in the control unit CONT1C.

As the information to be retrieved, for example a word "HASHI", stored in the memory unit MEMC does not coincide with the key input information for example "H", "A" and "S", the control unit CONT1C releases a signal, through the signal line S3C, for actuating the control unit CONT2C. In this case the uncoincidence detector ENORC in FIG. 6 releases the signal "0" in the comparisons of "H", "A" and "S", and releases an uncoincidence signal "1" in the comparison of the "H" in the stored information "HASHI" and "I" of the key input information to set the flip-flop F1C, whereby said signal "1" is counted by the counter C1C.

At the same time the coincidence detector EOR1C compares the "H" in the stored information with "blank" in the key input information, while the coincidence detector EOR2C compares the "I" in the stored information with the "I" in the key input information. Thus said detector EOR2C releases a signal "1" which is supplied through the OR gte OR21C to the reset terminal RC of the flip-flop F1C. Said flip-flop F1C is not reset by said signal as it is designed to be reset by a signal "0".

Subsequently the detector EOR1C compares the "I" in the stored information with the "blank" in the key input information while the detector EOR2C compares the blanks in both information to release a coincidence signal, whereby the flip-flop F1C maintains the set state thereof. Simultaneously the uncoincidence detector ENORC compares the "I" in the stored information with the "blank" in the key input information to release an uncoincidence signal, which step advances the content of the counter C1C.

In this manner and at this stage it is identified that the key input information "HASHI" is not a data different from "HASHI" by one character but lacks a letter "H" by error.

Upon completion of comparison of characters of a predetermined maximum number, there is generated a timing pulse TEC to supply the output signal "1" from the flip-flop F1C through the OR gate OR22C to the AND gate G1C, whereby the data in the registers R2C and R21C are released through the register R3C and AND gate G1C to the signal line S5C.

In this manner it is rendered possible to retrieve stored information resembling the key input information.

In a similar manner the stored information can be retrieved for example by key input data "HOSHI" as the counter C1C releases a signal "1" to open the gate G1C upon receipt of the timing pulse TEC. Also the stored information can be retrieved by key input data "HASSI" as the coincidence detector EOR1 detects the error.

Also it will be apparent from the foregoing explanation that the stored information cannot be retrieved by key input data "HOSI" or "HAASI" which contain two errors.

Although the foregoing embodiment has been designed for detection of one error, it will be apparent that the same principle is also applicable to the detection of two or three errors.

In a data retrieving apparatus wherein the memories are structured in pairs to store pairs of an alphabet code and a numeric code and said numeric codes are retrieved by actuation of alphabetic keys, the retrieval by resembling information rendered possible by the present invention not only facilitates the method of use but also increases the speed of retrieval.

The confirmation of the information can be further assured if the presence of a resembling information, namely the output from the control unit CONT2C, is indicated for example by a warning lamp.

Also in case plural stored information can be identified resembling the key input information, it will be easily conceivable from the present invention to display such plural information in succession upon each actuation of the read key or at a predetermined interval.

In the following there will be explained an embodiment capable of processing the memorandum information stored in the apparatus.

Figure 7:
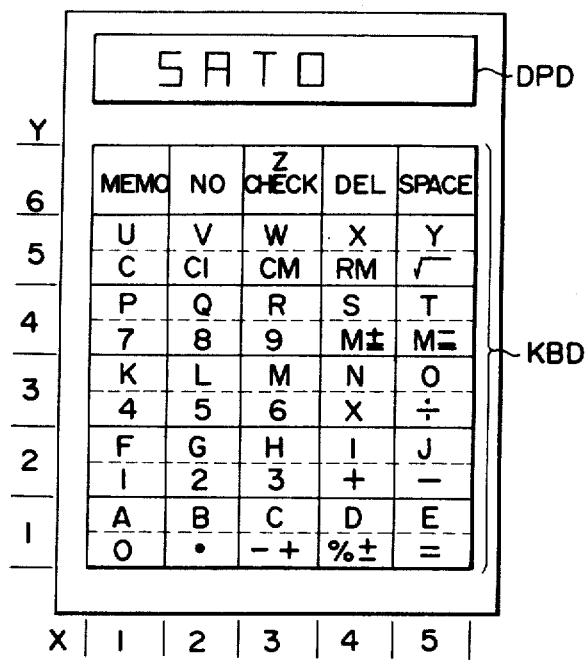
FIG. 7 is an external view showing another embodiment of the present invention.

FIG. 7 is an external view of such embodiment, wherein a keyboard KBD comprises calculating function keys and memorandum function keys. The keys in the rows Y1–Y5 have the functions same as the keys for arithmetic calculations in an ordinary electronic calculators, but also function as the alphabet input keys upon actuation a key MEMO located in the row Y6, column X1.

The key input instruction by said key MEMO continues until another key NO (row Y6, column X2) is actuated, after which the keys in the row Y1–Y5 perform the functions shown in the lower side of each key.

A key CHECK (row Y6, column X3) is provided for checking the memory contents in a manner to be explained later, the function of said key CHECK being also switchable by said key MEMO and key NO.

A key DEL (row Y6, column X4) is provided to clear the content of an input buffer to be explained later.

A key SPACE is provided for providing a space in a row of characters for easier legibility.

DPD is a display unit for displaying the input information, memory content or the result of calculation.

Figure 8:
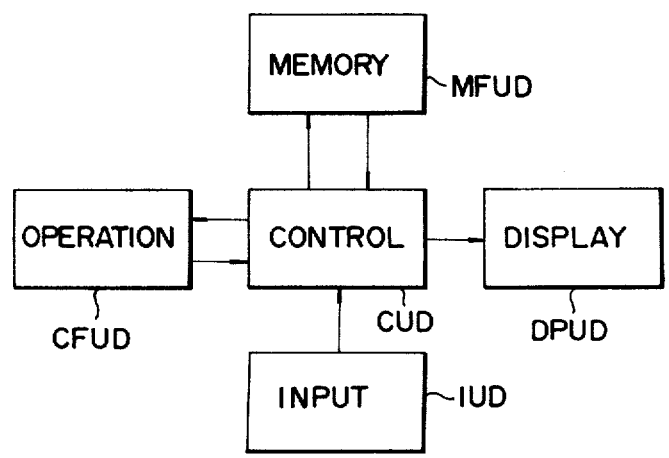
FIG. 8 is a block diagram of the embodiment shown in FIG. 7.

FIG. 8 is a block diagram of the embodiment shown in FIG. 7, wherein there are shown:

an input unit IUD for generating signals corresponding to the actuation of various keys shown in FIG. 7;

a control unit CUD for performing a control function to be explained later in response to the signals from said input unit IUD;

an operation unit or calculating function unit CFUD for performing arithmetic calculations;

a memory function unit MFUD for controlling paired data consisting of characters and numerals; and a display unit DPUD for displaying data in said operation unit CFUD or memory function unit MFUD.

Figure 9:
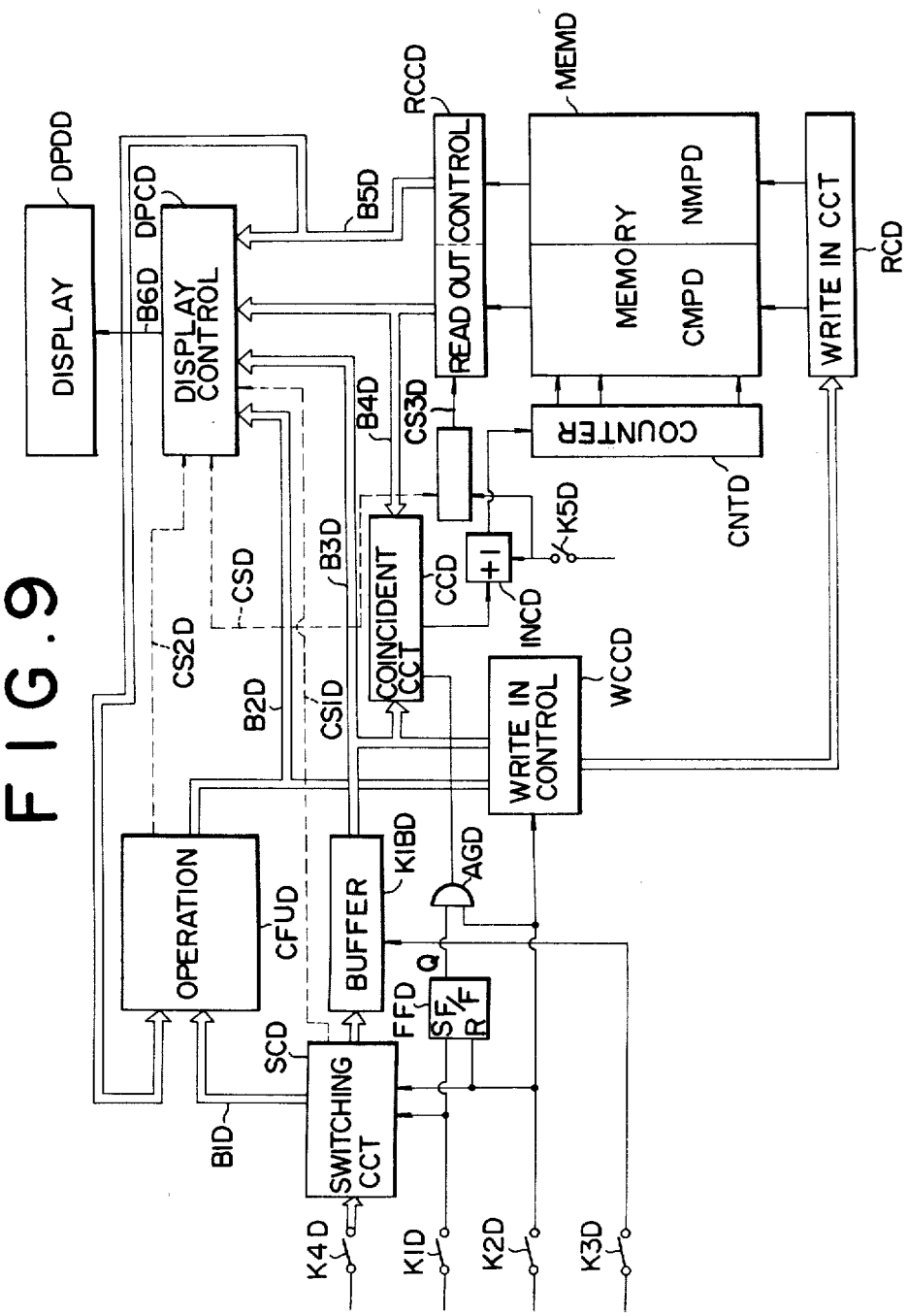
FIG. 9 is a detailed block diagram of the embodiment shown in FIG. 8.

FIG. 9 is a block diagram of a principal portion of the embodiment shown in FIGS. 7 and 8, wherein there are shown:

a key K1D corresponding to said key MEMO;

a key K2D corresponding to said key NO;

a key K3D corresponding to said key DEL;

a key K4D corresponding to other keys shown in FIG. 7;

a key K5D corresponding to said key CHECK;

a switching circuit SCD for diverting the path of the signal from said key K1D in response to the actuation of said key MEMO and restoring said path to the original in response to the actuation of said key K2D;

a key input buffer KIBD for storing the signals from the keys K4D after the actuation of said key MEMO;

an operation unit or calculating function unit CFUD for processing the data and functions supplied from said switching circuit SCD and the data stored in a memory to be explained later and releasing renewed data;

a write-in control circuit WCCD for performing the control to enter the contents of said key input buffer KIBD and of said operation unit CFUD into the memory to be explained later in response to the actuation of said key NO;

a read-out control circuit RCCD for reading the content of the memory upon receipt of the signal from a coincidence circuit from the key CHECK;

a memory MEMD capable of storing characters in a character memory portion CMPD and numerals in a numeral memory portion NMPD by a single addressing;

a counter CntD for addressing said memory MEMD;

a write-in circuit RCD for entering data into said memory MEMD;

a coincidence circuit CCD for comparing the content of said key input buffer KIBD with the content of the character memory portion DMPD of said memory MEMD addressed by said counter CntD and releasing a signal in the absence of coincidence thereby activating a step increasing circuit INCD to change the content of said counter CntD;

a flip-flop FFD to be set by said key MEMO and to be reset by said key NO;

an AND gate AGD receiving the output Q from the flip-flop FFD and the signal from the key NO to activate the coincidence circuit CCD at the second actuation of said key NO, wherein said signal being generated by the delay time of said flip-flop;

a display control unit DPCD for controlling the display of data in the operation unit CFUD, key input buffer KIBD and memory MEMD; and a display device DPDD for displaying the data supplied through said display control unit DPCD.

The embodiment of the above-explained structure functions in the following manner.

In order to enter paired data, for example "CANON 03-758-2111", the keys are actuated in the following order: "MEMO", "C", "A", "N", "O", "N", "NO", "0", "3", "SPACE", "7", "5", "8", "SPACE", "2", "1", "1", "1" and "NO".

Upon actuation of the key MEMO, the switching circuit SCD is activated to enable input of alphabets from the keyboard KBD and to set the flip-flop FFD which thus releases an output signal "1" from the output terminal Q thereof.

Upon subsequent key actuations in the order of "C", "A", "N", "O" and "N", the corresponding key code signals are successively stored in the input buffer KIBD, of which content is displayed, by the signal CSID of the switching circuit SCD, on the display device DPDD through a signal bus B3D and said display control unit DPCD.

Upon subsequent actuation of the key NO, the flip-flop FFD releases from the output terminal Q thereof a signal "1" which is supplied through the AND gate AGD to drive the coincidence circuit CCD.

Thus the content of the key input buffer KIBD is compared with the content of the character memory portion CMPD of the memory MEMD, and, in the absence of coincidence, the step increasing circuit INCD is activated to advance the counter CntD. In this manner the contents of the memory MEMD are investigated in succession.

In the above-mentioned example, the counter CntD terminates the function thereof after one cycle if the data "CANON" are not stored in the character memory portion CMPD. Also the key input instruction is not changed as the switching circuit SCD remains connected to the operation unit CFUD by the actuation of the key NO.

Upon subsequent key actuations in the order of "0", "3", "SPACE", "7", "5", "8", "SPACE", "2", "1", "1" and "1", the input data "03-758-2111" are stored in a memory in the operation unit CFUD and displayed, by a control signal CS2D, on the display device DPDD through the display control unit DPCD.

The subsequent actuation of the key NO activates the write-in control circuit WCCD, whereby the data "CANON" in the key input buffer and the data "03-758-2111" in the operation unit CFUD are stored in an address designated by the counter CntD.

The data stored in the memory MEMD can be read in the following manner.

Upon key actuations in the order of "C", "A", "N", "O", "N" and "NO", the data "CANON" are stored in the key input buffer KIBD in the above-explained manner, and compared, by the key NO, with the content of the character memory portion CMPD of the memory MEMD.

Upon detection of the data "CANON" stored in the memory MEMD, the coincidence circuit CCD terminates the output of uncoincidence signal to stop the advancement of the counter CntD, and supplies a coincidence signal CS3D to the read-out control circuit RCCD, whereby the display control circuit DPCD reads the data "03-758-2111" from the address designated by the counter CntD through a signal bus B5D and causes the display device DPDD to display said data.

If the space symbol "-" is not required in the foregoing example, the keys may be actuated in the order of "0", "3", "7", "5", "8", "2", "1", "1" and "1".

The above-mentioned read-out data are also supplied in the operation unit CFUD. Thus, after the display of the data "7582111" is obtained by the key operations "MEMO", "C", "A", "N", "O", "N" and "NO", subsequent key actuations in the order of "X", "2" and "=" cause the operation unit CFUD to perform a calculation 7582111×2, whereby the updated data 15164222 are displayed on the display device DPD by a control signal CS2D.

The subsequent actuation of the key NO activates the write-in control circuit WCCD, whereby said data 15164222 are stored in the numeral portion NMPD at an address designated by the content of the counter CntD which has been stopped after the comparison of the data "CANON". At the same time the data "CANON" stored in the key input buffer KIBD are also stored in the character memory portion CMPD at the same address.

In this manner the numerical information can be processed in the operation unit CFUD and restored in the numeral memory portion. Stated differently the content of the numeral memory can be utilized as the data for the operation unit CFUD.

The operation unit CFUD has the functions of at least addition, subtraction, multiplication and division. Thus in case a name A of the bank account and a deposit amount 10,000 are respectively stored in the character memory portion and in the numeral memory portion, it is rendered possible to add an amount for example 1,000 by the key operations "MEMO", "A" and "NO" to call back said amount 10,000, followed by the key operations in the order of "+", "1", "0", "0", "0", "=" and "NO", whereby the data 11,000 are stored in the numeral memory paired with the data A in the character memory portion CMPD. The key CHECK causes the successive display of the contents of said character memory portion CMPD. In response to the actuation of said key CHECK, the step increasing circuit INC is activated to change the content of the counter CntD and the read-out control circuit RCCD is simultaneously activated to supply the content of the memory MEMD designated by the counter CntD through a signal bus B5D to the display control circuit DPCD thereby displaying the content of the character memory portion CMPD.

It is also possible to retrieve the content of the numeral memory portion NMDP corresponding to said content of the character memory portion CMPD by providing an unrepresented flip-flop which is to be set by the actuation of the key CHECK and to be reset by the actuation of the key MEMO and by sending the content of the read-out control circuit RCCD to the key input buffer KIBD and activating the coincidence circuit CCD as the trailing end of the output Q of said flip-flop.

The key K3D in FIG. 9 corresponds to the key DEL in FIG. 7 and functions to erase the content of the key input buffer KIBD. The DEL, if actuated for example after the key operations in the order of "MEMO", "C", "A", "N" and "O", erase the content "CANO" of the key input buffer KIBD to restore the initial state.

Now in the following there will be explained the method of correcting the memorandum information just entered into or already stored in the electronic apparatus.

Figure 10:
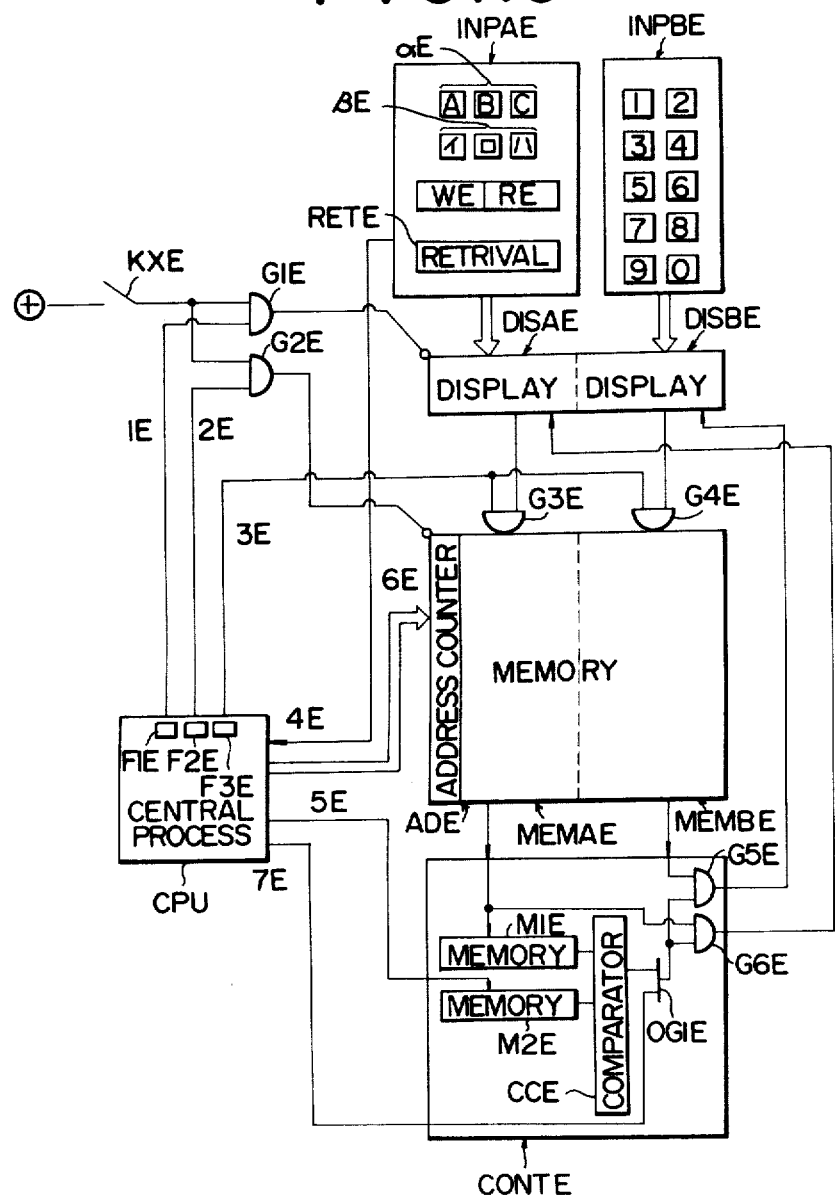
FIG. 10 is a block diagram of an embodiment of the present invention.

FIG. 10 is a block diagram of an embodiment for enabling such correction, wherein there are shown:

an input unit INPAE comprising alphabet keys αE, Japanese character keys βE, a write-in key WE, a read-out key RE, a retrieval key RETE etc. For generating corresponding code signals;

an input unit INPBE comprising numeral keys for generating corresponding code signals;

a display unit DISAE comprising display devices, a memory etc. and capable of storing and displaying the key information received from said input unit INPAE;

a display unit DISBE comprising display devices, a memory etc. and capable of storing and displaying the key information received from said input unit INPBE;

a memory MEMAE for storing the item information in the manner to be explained later received from said input unit INPAE;

a memory MEMBE for storing the plural numerical information in the manner to be explained later received from said input unit INPBE;

an address counter ADE for generating address information for designating the addresses of said memories MEMAE and MEMBE, wherein each of said address information corresponding to a pair of item information and numerical information; and a central processing unit CPUE for performing the control explained in the following upon receipt of the key information from the input unit INPAE through a signal line 4E.

In response to the actuation of the read-out key RE, the central processing unit CPUE supplies the address change instructions in succession through a signal line 6E to the address counter ADE, sets a flip-flop F2E and supplies the code information corresponding to the key operations in the input units to a data control unit CONTE to be explained later.

Also in response to the actuation of the retrieval key RETE, the central processing unit CPUE supplied address change instructions through the signal line 6E, sets the flip-flop F2E to release a signal therefrom, and releases a signal to a signal line 7E.

Also in response to the actuation of the write-in key WE, the central process unit CPUE supplies the address change instructions through the signal line 6E to the address counter ADE, sets the flip-flop F3E and releases a signal to a signal line 3E.

Also in response to the actuation of the alphabet keys αE and Japanese character keys βE, the central processing unit CPUE sets the flip-flop F1E nd releases a signal to a signal line 1E. Further, in response to the actuation of the write-in WE, read-out key RE or retrieval key RETE, the control processing unit CPUE resets said flip-flop F1E.

In FIG. 10 there are also shown:

a data control unit CONTE comprising a memory M1E, a memory M2E, a comparing circuit CCE, AND gates G5E, G6E and an OR gate OGiE, said data control unit CONTE being adapted, in response to the signals received from said central processing unit CPUE, to transfer the contents of the memories MEMAE, MEMBE to the display units DISAE, DISBE, or to compare the code information from the input unit INPAE with the content of said memory MEMAE and, in case of coincidence, to transfer the contents of the memories MEMAE, MEMBE to the display units DISAE, DISBE; and a correction key KXE of which output signal is utilized for clearing the display units DISAE, DISBE or for clearing the contents of memories MEMAE, MEMBE designated by the address counter ADE, according to the state of said flip-flops F1E, F2E.

The function of the above-explained embodiment is as follows.

Upon actuation of the alphabet keys αE or Japanese character keys βE for writing key information into the memories MEMAE, MEMBE or reading the content of the memory MEMBE, the key information is transmitted through the signal line 4E to the central processing unit CPUE which thus sets the flip-flop F1E, and also displayed in the display unit DISAE.

In case there is an error in the foregoing key actuations, there is actuated the correction key KXE of which output signal is transmitted, through the AND gate G1E now opened by the set signal of said flip-flop F1E, to the memory in the display units DISAE, DISBE thereby erasing the key information stored therein. Successively said flip-flop F1E is reset by the central processing unit CPUE.

In case of correcting the contents of the memories MEMAE, MEMBE, the retrieval key RETE is repeatedly actuated whereby the central processing unit CPUE returns the address counter ADE to the initial state and opens the AND gates G5E, G6E in response to the first actuation of the retrieval key RETE and then transfers the contents of said memories in succession from the leading address thereof to the display units DISAE, DISBE through said gates G5E, G6E.

Also in response to the actuation of said retrieval key RETE, the central processing unit CPUE sets the flip-flop F2E to open the AND gate G2E.

Thus, when the data requiring correction are retrieved by repeated actuations of the retrieval key RETE, the address counter ADE stores the address information corresponding to said data requiring correction. Upon actuation of the correction key KXE in this state, the output signal therefrom is supplied, through the AND gate G2E now opened by the set signal from the flip-flop F2E, to the memories MEMAE, MEMBE, whereby the content of a required memory location is cleared by the outputs from the AND gate G2E and from the address counter ADE.

After the above-mentioned clearing function, new data can be entered into the above-mentioned memory location by the ordinary key operations.

Also the foregoing embodiment can be easily modified in such a manner that the correction is made only on the display during the write-in and read-out, and made on the contents of the memories during the retrieval operation. Similarly it is easily possible to correct only either one of the paired data.

As explained in the foregoing, the present invention allows avoidance of erroneous data correction and to reduce the number of keys since the function of the correction key is made different according to the state of the electronic apparatus.

In the following there will be explained the method of information display control in case the information to be displayed has a larger number of digits than the number of digits of the display device.

Figure 11:
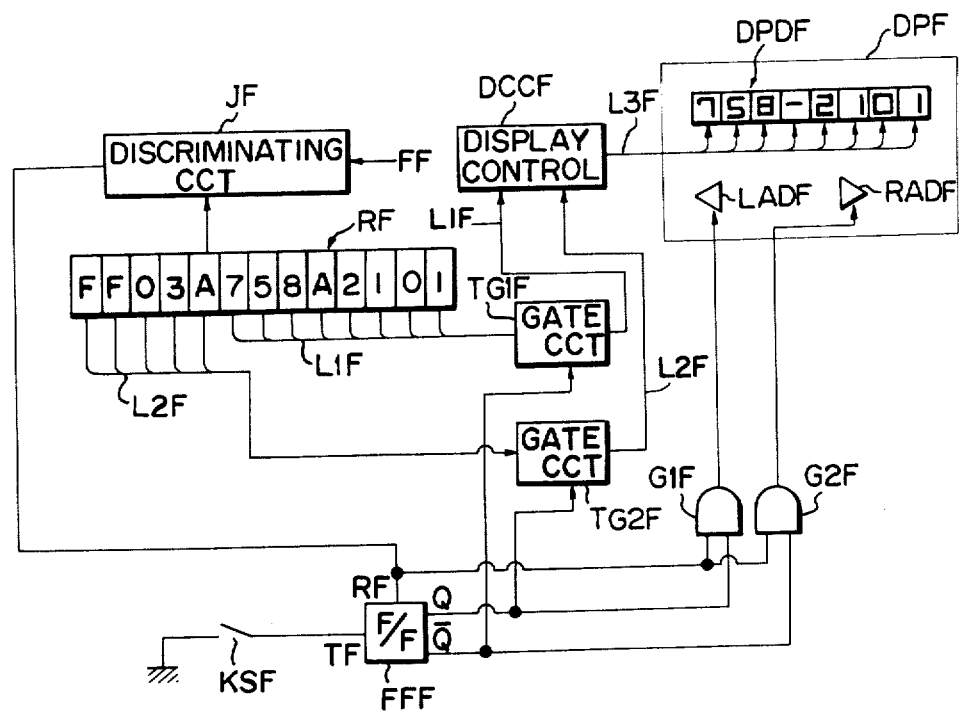
FIG. 11 is a block diagram of an embodiment of the present invention.

FIG. 11 is a block diagram of an embodiment capable of such display control, wherein there are shown:

a data memory register RF of 13 digits which memorizes codes F in digits not storing information to be displayed, and which memorizes, in the illustrated example, codes F in the upper two digits and a telephone number 03-758-2101 in the lower eleven digits, wherein the space code "-" being represented by a code A;

a display unit DPF comprising a display device DPDF of 8 digits and display means for indicating the nature of display on said display device DPDF, namely a right arrow (>) display device RADF for indicating that the display represents the content of lower eight digits of the register RF and a left arrow (<) display device LADF indicating that the display represents the content of remaining digits of said register RF;

a judging circuit JF consisting for example of an exclusive logic adding circuit for identifying if the number of digits of the data stored in the register RF is in excess of the number of digits of the display unit DPF, said judging circuit being adapted to compare, in the illustrated example with a display device of 8 digits, the content of the 9th digit from the right or the register RF with a reference code F and to release an output signal "1" in case no coincidence is obtained in said comparison;

a key switch KSF for instructing the display of either the lower digits or the upper remaining digits of the register RF;

a flip-flop FFF receiving the output signal of said key switch KSF at the trigger terminal TF and the output of said judging circuit JF at the reset terminal RF, wherein the output $\overline{Q}$ of said flip-flop being rendered "1" by an output signal "0" from said judging circuit JF regardless of the signal from said key switch KSF;

a gate circuit TG1F which transmits the content of lower eight digits of the register RF through a signal line L1F to a display control circuit DCCF in response to an output $\overline{Q}=1$ from said flip-flop FFF;

a gate circuit TG2F which transmits the content of remaining upper digits of the register RF through a signal line L2F to the display control circuit DCCF in response to an output Q=1 from said flip-flop FFF;

a gate G1F to be controlled by the output of said judging circuit JF to transmit the output Q=1 from said flip-flop FFF to said left arrow display LADF thereby lighting said display device;

a gate G2F to be controlled by the output of said judging circuit JF to transmit the output $\overline{Q}=1$ from said flip-flop FFF to said right arrow display RADF thereby lighting said display device; and a display control circuit DCCF for decoding the content of the register RF supplied thereto and driving the display device DPDF through a signal line L3F.

In the following there will be given an example of the function of the above-explained embodiment.

It is now assumed that the register RF stores the illustrated data FF03A758A2101, and the flip-flop FFF releases an output signal $\overline{Q}=1$. In this state the content of the signal line L1F is displayed on the display device DPDF through the gate circuit TG1F, display control circuit DCCF and signal line L3F, while the output $\overline{Q}$ of the flip-flop FFF is transmitted through the gate G2F to light the right arrow display RADF. Upon subsequent actuation of the key switch KSF the flip-flop FFF is inverted to release an output signal Q=1, whereby the content of the signal line L2F is displayed through the gate circuit TG2F, display control circuit DCCF and signal line L3F while the left arrow display LADF is lighted by the output from the gate G1F.

In case the register RF stores data not exceeding 8 effective digits, for example "FFFFFF1234567", the judging circuit JF releases a zero output to maintain the flip-flop FFF in the reset state to release a signal $\overline{Q}=1$ regardless of the actuation of the key switch KSF, whereby the content of the lower digits is continuously displayed while neither the right arrow display RADF nor the left arrow display LADF is lighted since the gates G1F, G2F are closed by the zero output from the judging circuit JF.

Also in case said register is connected to the output of a calculating circuit capable of performing calculations in a doubled digit number, it is possible to display all the content of said register if an instruction is given to the flip-flop FFF whether the upper digits or the lowr digits are to be displayed at first.

As explained in the foregoing, the present invention allows automatic identification of the presence of data of a digit number in excess of a displayable digit number and to display a part of said data with a particular symbol, said display being easily switchable by a switching key, and also performs the display in a conventional manner when the digit number of said data is not in excess of the displayable digit number, while said switching key and particular symbol being disabled during such conventional display.

In the following there will be explained a method of control for reading the memorandum information stored in combination with a time information.

Figure 12:
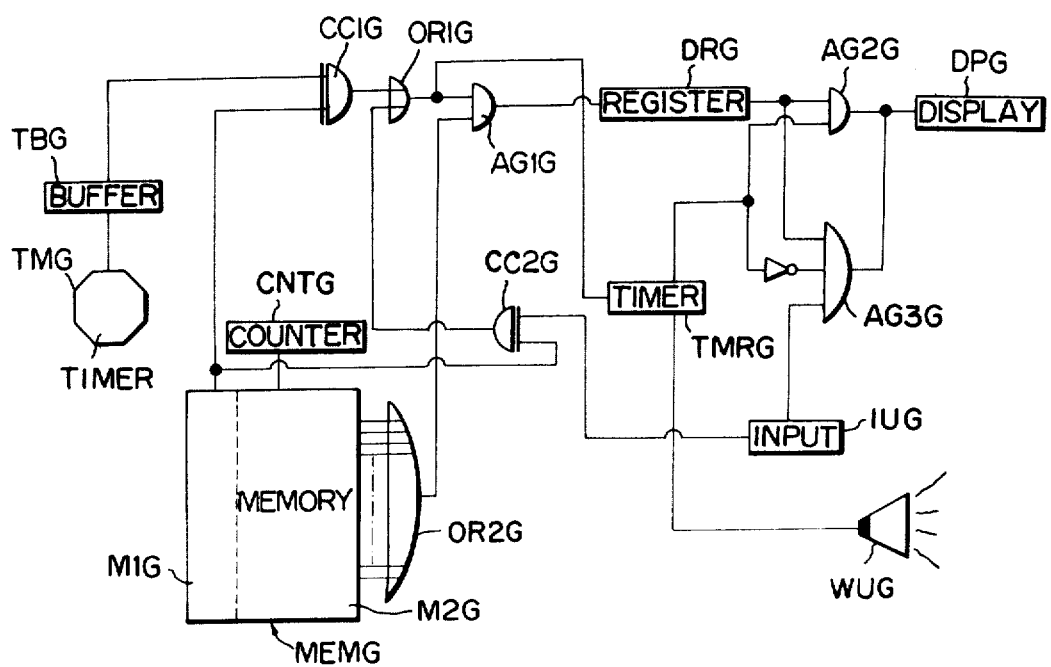
FIG. 12 is a logic block diagram showing an embodiment of the present invention.

Referring to FIG. 12 showing a block diagram of an embodiment capable of such control, there are shown;

a memory MEMG divided into two memory portions M1G and M2G, wherein said memory M1G is adapted to store information on date and time while said memory M2G is adapted to store information on meeting, location, attendants etc. scheduled at said stored date and time;

a counter CNTG the content of which is utilized for addressing said memory MEMG;

a time-measuring unit TMG for generating information on date and time;

a buffer memory TBG for temporarily memorizing the output from said time-measuring unit TMG;

a comparing circuit CC1G for comparing the contents of said buffer memory TBG and of the memory M1G and releasing, in case of coincidence, a coincidence signal through an OR gate OR1G to an AND gate AG1G thereby transmitting the content of said memory M1G through said gate AG1G to a display register DRG;

a comparing circuit CC2G for comparing the data on date and time to be supplied from an input unit to be explained later with the content of the memory M1G, and releasing, in case of coincidence, a coincidence signal through the OR gate OR1G to the AND gate AG1G thereby transmitting the content of the memory MEMG through an OR gate OR2G and the AND gate AG1G to the display register DRG;

a timer TMRG adapted to generate a signal for a period of 2 to 3 minutes upon receipt of the coincidence signal from said comparing circuit CC1G;

an AND gate AG2G for transmitting the content of the display register DRG to a display unit DPG upon receipt of the signal from said timer TMRG;

a warning unit WUG for generating a sound signal upon receipt of the signal from said timer TMRG; and an input unit IUG for retrieving data from the memory MEMG and being adapted to supply the entered data on the date and time to the comparing circuit CC2G through an unrepresented input buffer, and also to supply a signal to an AND gate AG3G to display the content of said display register DRG by the display unit DPG.

In the following explained is the function of the above-explained embodiment.

It is now assumed that the memory MEMG stores data, for example, of "meeting at room No.301 on March 1, 8:30 a.m."

The data on date and time are entered into the buffer memory TBG when the time-measuring unit TMG releases the data of March 1, 8:30 a.m. On the other hand the counter CNTG supplies the address data in succession to the memory MEMG, whereby the data on date and time at each address in the memory M1G are supplied to an input terminal of the comparing circuit CC1G.

Thus the comparing circuit CC1G generates a coincidence signal when the counter Cnt reads the data of March 1, 8:30 a.m. from the memory M1G, thereby transmitting the paired data in the memory M2G through the OR gate OR2G and AND gate AG1G to the display register DRG, of which content is supplied to the display unit DPG and displayed therein through the AND gate AG2G upon receipt of the signal of the timer TMRG activated by the coincidence signal from said comparing circuit CC1G. Simultaneously the warning unit WUG generates a sound signal in response to the signal from said timer TMRG.

After the lapse of a predetermined period, the timer TMRG terminates the signal output to close the AND gate AG2G, thereby extinguishing the display of the content of the display register DRG.

Another data corresponding to another time information released by the time-measuring unit TMG, if stored in the memory MEMG, will be displayed subsequently in a similar manner.

Also it is possible to confirm the schedule by the input unit IUG in the following manner.

By entering the data on date and time from said input unit IUG for example in order to confirm whether March 1, 8:30 a.m. is already occupied, the comparing circuit CC2G compares the input data with the content of the memory M1G addressed in succession by the counter CNTG, and, in case of coincidence, transmits the content of the memory M2G through the gate AG1G to the display register DRG, whereby said content being displayed on the display unit DPG through the gate AG3G, which is opened by a signal from the input unit IUG.

The display in the present embodiment is achieved for example in a form of MEETING ROOM NO. 301.

As explained in the foregoing, the present invention allows to confirm the schedule with simple key operations instead of manipulating a schedule book, and provides an alarm at the scheduled time even if the appointment is forgotten. Thus the present invention provides a product extremely useful for people working in a busy schedule.

Now there will be explained an electronic apparatus provided with an operation unit for arithmetic calculations, a memory unit for storing paired data, and a switch for selecting either said operation unit or said memory unit.

Figure 13:
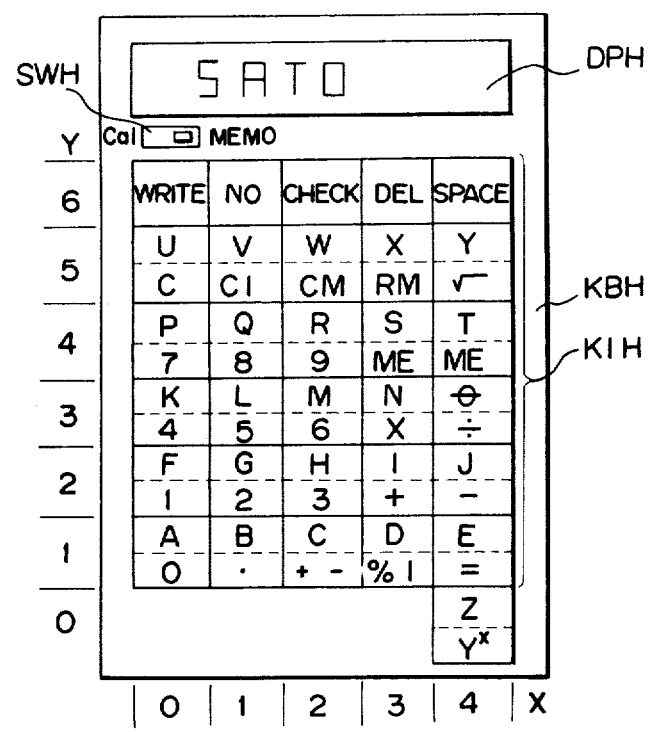
FIG. 13 is an external view of another embodiment of the present invention.

Referring to FIG. 13 showing an embodiment of such apparatus in an external view, KBH is a keyboard and SWH is a switch for selecting the function of the apparatus either as an electronic memorandum or as a calculator respectively when said switch is located at the "MEMO" position or at the "Cal" position.

KIH is a group of keys for entering numerals, symbols, characters, instructions etc., wherein the keys arranged in the rows Y5 to Y0 being adapted to function for entering either data and instructions for the calculator or characters for the electronic memorandum respectively when said switch SWH is located either at the "Cal" position or at the "MEMO" position while the keys arranged in the row Y6 being adapted to control the functions of the electronic memorandum, in which the key at the column X0 is for entering the input data into a determined memory; the key at the column X1 is for calling the other of the paired data, and for enabling, in the electronic memorandum function mode, the functions of input keys for the data and instructions for the calculator; the key at the column X2 is for confirming the stored data by displaying one data at each actuation; the key at the column X3 is for calling the other of the paired data stored in the apparatus and also for clearing the input data in case an error therein; and the key at the column X4 is for entering a space between the characters or numerals.

DPH is a display unit for displaying the data corresponding to the actuations of the above-mentioned keys. Said display unit is composed for example of segment display elements for displaying numerals, alphabets and symbols.

Figure 15:
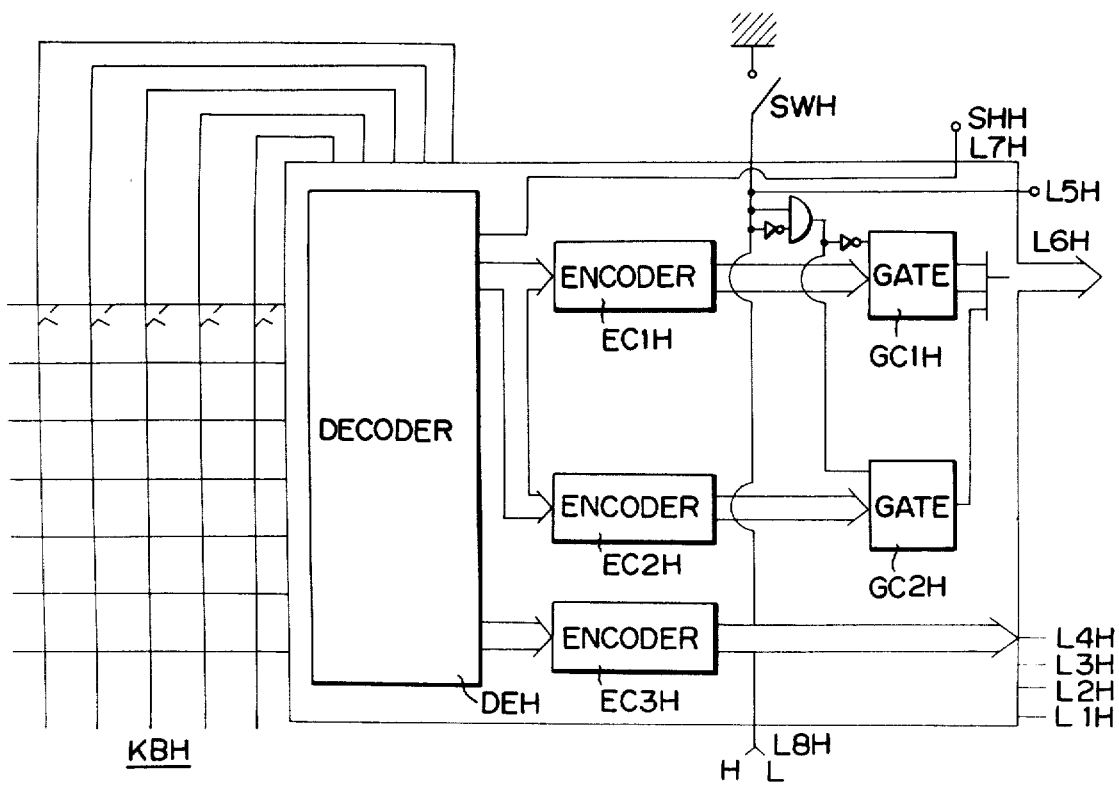
FIG. 15 is a detailed block diagram of an input unit IU shown in FIG. 14.
Figure 14:
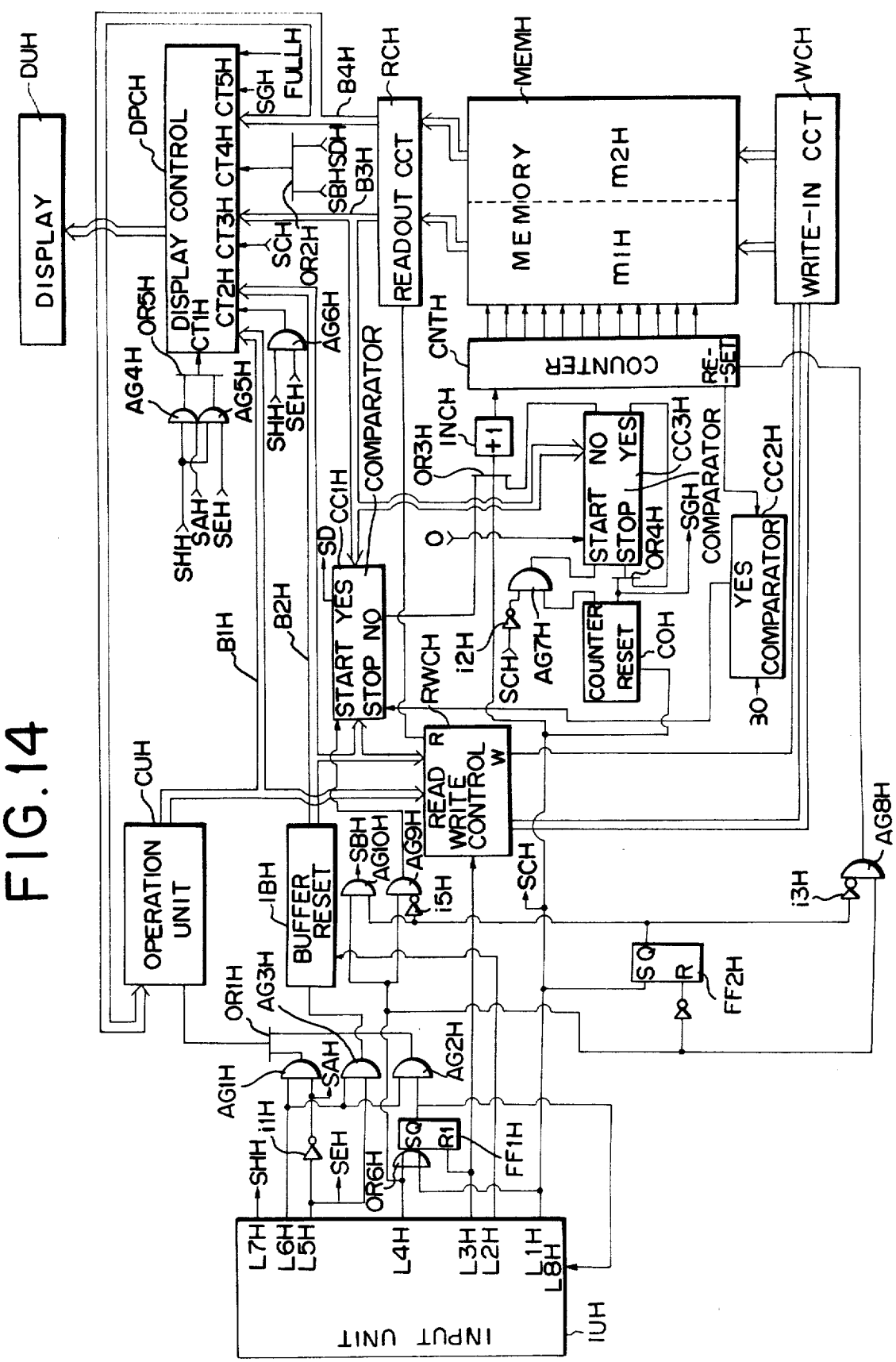
FIG. 14 is a block diagram of the embodiment shown in FIG. 13.

FIG. 14 is a block diagram of the embodiment shown in FIG. 13, wherein IUH is an input unit of which detailed block diagram is shown in FIG. 15. Said input unit IUH supplies the signal from the key CHECK (row Y6, column X2) to a signal line L1H, the signal from the key DEL (row Y6, column X3) for clearing the content of an input buffer IBH to a signal line L2H, the signal from the key WRITE (row Y6, column X0) for entering the data into a memory to be explained later to a signal line L3H, the signal from the key N0 (row Y6, column X1) to a signal line L4H, the signal from the switch SWH to a signal line L5H, and the signals from other keys to a signal line L6H in a coded form. Also the signal line L7H supplies a signal when the keys in the rows Y0–Y5 are actuated.

CUH is an operation unit for arithmetic calculations receiving the input data from the input unit IUH, through AND gates AG1H, AG2H and an OR gate OR1H, wherein said gate AG1H being closed or opened respectively when the switch SWH is located at the "MEMO" position or at the "Cal" position, while said gate AG2H being controlled by the output from a flip-flop FF1H which is set by the output of a comparing circuit to be explained later thereby opening said gate AG2H and is reset by the signal from the key WRITE.

IBH is an input buffer for storing the data of characters and space entered from the input unit IUH through an AND gate AG3H which is to be opened by the signal from the key MEMO.

MEMH is a memory composed of two portions and adapted to store for example 30 pairs of data, wherein the first memory portion m1H stores one portion of said paired data while the second memory portion m2H stores the other portion of said paired data. The paired data stored in the memory MEMH are addressed by a counter CNTH and read from the designated address by a read-out circuit RCH. Also the data entry into the memory MEMH is achieved by a write-in circuit WCH at an address designated by the counter CNTH. Said write-in circuit WCH and read-out circuit RCH are controlled by the signals R and W from the read-write control circuit RWCH which continuously generates the signal R in the normal state. The counter in the present embodiment is designed to cyclically count numbers from 1 to 30, thus returning to the state "1" after counting "30".

CC1H is a comparing circuit which compares the contents of the input buffer IBH and the first memory portion m1H of the memory MEMH, and, in the absence of coincidence, activates the step increasing circuit INCH thereby step advancing the content of the counter CNTH, or, in case of coincidence, transmits the content of the second memory portion m2H of the memory MEMH to a display control circuit DPCH through the read-out circuit RCH to perform display on a display unit DUH.

CC2H is a comparing circuit which compares the content of the counter CNTH with a reference data "30" and, in case of coincidence, supplies a signal to the comparing circuit CC1H to terminate the function thereof and also to the comparing circuit CC3H to initiate the function thereof.

CC3H is a comparing circuit for controlling the counter CNTH in such a manner that the content thereof indicates the address of the memory MEMH not storing the data. For this purpose the comparing circuit CC3H compares the data stored in each address of the first memory portion m1H with a reference data "0", and terminates the comparing function in case of coincidence or activates the step increasing circuit INCH through the OR gate OR3H in case of the absence of coincidence, whereby the content of the counter CNTH is modified to compare the content of the succeeding address of the first memory portion m1H.

C0H is a counter composed of a ternary counter for counting the coincidence signals generated by the comparing circuit CC2H.

DPCH is a display control circuit for selecting the data to be displayed and transmitting such data to a display unit DUH in response to the signals supplied to control signal input terminals CT1H–CT5H. Said display control circuit is provided with a flip-flop to be set or reset at the leading end of signals supplied for example to the input terminals CT1H–CT4H, said flip-flop being set by the signal supplied to one of said terminals and reset by the signals supplied to the other terminals. The terminal CT5H receives a signal SGH from the counter C0H for causing an alarm indication on the display unit DUH.

Figure 16:
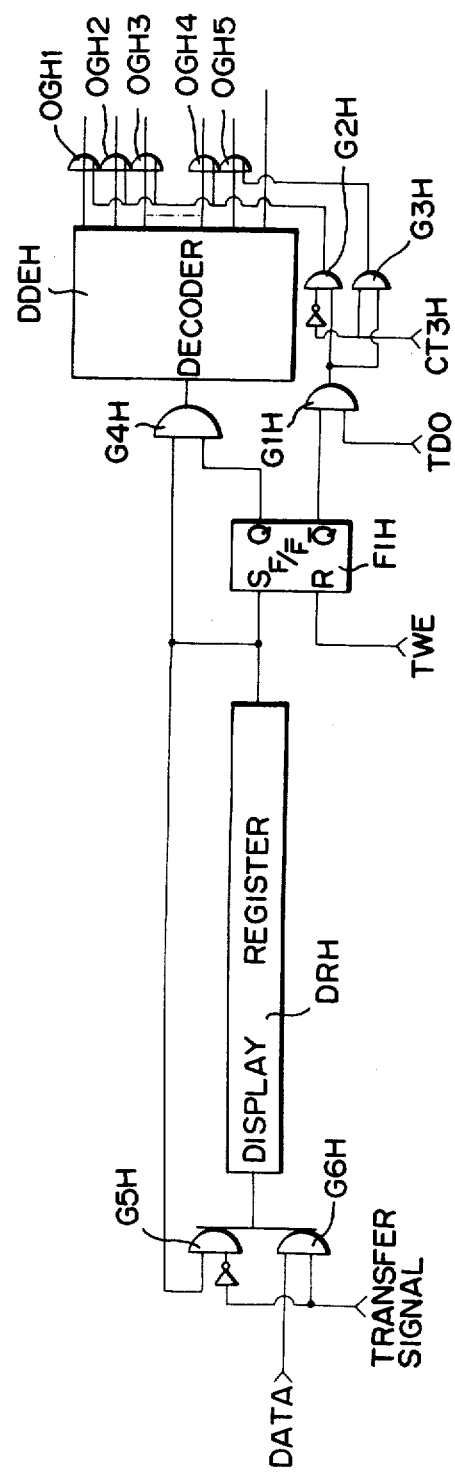
FIG. 16 is a partial block diagram of a display unit.

FIG. 16 is a detailed block diagram of a part of the display control circuit, wherein the data to be displayed are entered into the display register DRH through an AND gate G6H while a transfer signal is supplied thereto and are cyclically maintained through an AND gate G5H when said transfer signal is terminated. DDEH is a decoder for converting the content of said register DRH, supplied through an AND gate G4H, into display pattern information which is supplied through OR gates OGH1–OGH5 to the display unit DUH shown in FIG. 14. Also the above-mentioned data are supplied to a flip-flop F1H to identify if the register DRH contains any data.

Said flip-flop F1H is to be cleared by a pulse TWE at the end of one word, and the output $\overline{Q}$ thereof is connected to the AND gate G1H, of which the other input terminal receives the lowermost digit signal TD0 of the display device selecting signal to be supplied to the display unit DUH and of which output signal is supplied to the AND gates G2H, G3H, whereby said gate G3H supplies, in case of alphabetic display, signals representing corresponding symbols to the selected ones of said OR gates OGH1-OGH5 while said gate G2H supplies, in the numerical display, signals representing other symbols to the other ones of said OR gates OGH-1-OGH5.

Again referring to FIG. 14, there are also shown AND gate AG1H-AG10H, OR gates OR1H-OR6H, flip-flops FF1H, FF2H, and inverters i1H-i5H.

The embodiment of the above-explained structure functions in the following manner.

When the apparatus shown in FIGS. 13-16 is utilized as a calculator, the switch SWH shown in FIGS. 13-15 is set at the "Cal" position to supply a low level signal to the input unit IUH to select the gate circuit GC1H shown in FIG. 15, whereby the keys in the rows Y0-Y5 in the keyboard KBH respectively represent the meanings marked on the lower side of said keys, as shown in FIG. 13. Upon actuation of a key on the keyboard KBH for performing an arithmetic calculation, the actuated key is identified by the decoder DEH, and the corresponding code signal generated by the encoder EC1H is released from the input unit IUH through the gate circuit GC1H and supplied through the AND gate AG1H opened by the low level signal of the switch SWH and through the OR gate OR1H to the operation unit CUH. The code signal entered into the operation unit CUH are decoded therein, and the latest numerical data present therein are supplied through a signal bus B1H to the display control circuit DPCH which, in response to the leading end of a signal SHH generated by a key actuation signal supplied to the AND gate AG4H to be opened by a signal SAH supplied thereto through an inverter i1H, selects the numerical data supplied through said bus B1H and displays said data on the display unit DUH.

On the other hand when the switch SWH is set at the "MEMO" position, the gate circuit GC2H shown in FIG. 15 is activated whereby the keys in the rows Y0-Y5 on the keyboard KBH function to release input instructions corresponding to the meanings marked on the upper side of said keys.

It is now assumed, as an example, that a company name and a corresponding telephone number are entered into the memory as the paired data.

The switch SWH shifted to the "MEMO" position generates a high level signal to activate the gate circuit GC2H, whereby the actuated key in the rows Y0-Y5 is identified by the decoder DEH and the corresponding key code signal generated by the encoder EC2H is released from the input unit IUH through the gate circuit GC2H. A code signal corresponding to the space key is generated from both of the encoders.

Thus, upon actuation of the appropriate keys for entering a company name for example "CANON" after the switch SWH is shifted to the "MEMO" position, the code signals corresponding to "C", "A", "N", "O" and "N" are supplied from the input unit IUH through the signal line L6H and AND gate AG3H to the input buffer IBH of which content is further supplied to the display control circuit DPCH through the signal bus B2H for a display "CANON" on the display unit DUH since a key actuation signal is supplied to said display control circuit DPCH through the AND gate AG6H which is opened by the high level signal SE from said switch SWH.

Upon subsequent actuation of the key NO, a corresponding signal generated on the signal line L4H is supplied through the AND gate AG8H to reset the counter CNTH to a state "1" and to activate the comparing circuit CC1H thereby commencing the comparison of the content of the input buffer INH with the content of the first memory portion m1H of the memory MEMH addressed by said counter CNTH. In the absence of coincidence, a corresponding signal is supplied through the OR gate OR3H to activate the step increasing circuit INCH, whereby the content of said counter CNTH is step advanced to designate a succeeding address of the first memory portion m1H and the comparison is repeated in the above-explained manner.

In case the memory MEMH is empty, the comparing procedure explained above is repeated until the content of the counter CNTH reaches 30. The read-write control circuit RWCH, being normally in the read-out mode, reads the content of the memory addressed by the counter CNTH.

The comparing circuit CC2H generates a coincidence signal with a time delay when the content of the counter CNTH becomes 30 which is equal to the reference data 30 supplied as the other input to the comparing circuit CC2H.

On the other hand the comparing circuit CC1H releases a non-coincidence signal also at the address 30 to return the counter CNTH to the initial state "1". Thereafter the comparing circuit CC1H terminates the function thereof by the coincidence signal supplied from the comparing circuit CC2H.

Said coincidence signal also changes the counter C0H from the initial state "0" to a state "1" to activate comparing circuit CC3H thereby comparing a reference input signal "0" with the content of the first memory portion m1H. As the memory is now assumed to be empty, the comparing circuit CC3H generates a coincidence signal to terminate the comparing operation upon comparison at the address 1. Said comparing circuit CC3H is provided to cause the counter CNTH to designate an empty address. Thus, if coincidence is not obtained in the comparison, the step increasing circuit ICNH is activated to cause the counter CNTH to indicate the succeeding address.

In case all the addresses of the memory MEMH are fully occupied, the coincidence signal from the comparing circuit CC2H changes the counter C0H to a state "2" to terminate the function of said comparing circuit CC3H and is also supplied to the control terminal CT5H of the display control circuit DPCH for performing a display for a fully memory.

Now let us assume again that the memory MEMH is empty so that the counter CNTH is in the state "1".

The actuation of the key N0 also causes the flip-flop FF1H to generate a high level output signal Q=1 which is supplied through the inverter shown in FIG. 15 to activate the gate circuit GC1H thereby switching the input instruction from the keys in the rows Y0-Y5. Thus upon key operations of "7", "5", "8", "SPACE", "2", "1", "1" and "1" for entering a telephone number "758-2111", the corresponding code signals are entered through the AND gate AG2H and OR gate OR1H into the operation unit CUH and further transferred, by the output signal from the AND gate AG5H, through the signal bus B1H to the display control circuit DPCH for obtaining a display of "758-2111" on the display unit DUH.

Upon subsequent actuation of the key WRITE, the read-write control circuit RWCH enters the data in the input buffer IBH and in the operation unit CUH through the write-in circuit WCH into the address "1" designated by the counter CNTH. In the present embodiment the data "CANON" and the data "758-2111" are respectively stored in the first memory portion m1H and the second memory portion m2H.

The output signal from said key WRITE also caused the flip-flop FF1H to generate a lower level output signal Q=0 to reactivate the gate circuit GC2H of the input unit IUH, whereby the keys in the rows Y0-Y5 representing the meanings marked on the upper side of the keys.

Upon subsequent key operations for entering another data for example "SAD0" 888-8888", the data "SAD0" are stored in the input buffer IBH and displayed in the above-explained manner. Upon subsequent actuation of the key N0, there is at first conducted a search for the data "SAD0" already stored in the memory, and, in the absence of such stored data, the counter CNTH indicates an empty address as explained in the foregoing. Thus, in response to the actuation of the key WRITE, the data "SAD0" and "758-2111" are stored in the address "2" of the memory MEMH.

For the purpose of checking the content of the memory MEMH, the contents of the first memory portion m1H can be reviewed one by one by means of the actuation of the key CHECK.

In this operation the actuation signal of the key CHECK is supplied through the signal line L1H to activate the stop increasing circuit INCH thereby step advancing the content of the counter CNTH, and is also supplied to the control terminal CT3H of the display control circuit DPCH to transfer the content of the first memory portion m1H addressed by the counter CNTH through the read-out circuit RCH to said display control circuit DPCH for a display on the display unit DUH.

Also the actuation signal of said key CHECK resets the counter C0H and is supplied through the inverter i2H to the AND gate AG7H thereby disabling the comparing circuit CC3H.

Thus, in response to the repeated actuations of the key CHECK, the content of the counter CNTH is progressively changed to display the content of the first memory portion m1H in succession.

When data stored in the first memory portion m1H, for example data "SAD0", are displayed on the display unit, the corresponding telephone number can be displayed by the actuation of the key N0. The corresponding key actuation signal SBH is supplied to the control terminal CT4H of the display control circuit DPCH, whereby the data "888-8888" paired with the data "SAD0" are addressed by the counter CNTH and displayed on the display unit DUH. In this case the comparing circuit CC1H does not function since the AND gate AG9H is closed by the signal from the flip-flop FF2H.

In the operation of displaying the content of the first memory portion m1H on the display unit DUH in succession through the display control circuit DPCH in response to the actuation of the key CHECK, the content of the display register DRH is supplied to the set terminal of the flip-flop FH as shown in FIG. 16, whereby the lowermost digit signal TD0 for selecting the lower most digit of the display unit DUH functions through the AND gate G1 to drive particular segments in a display element in the display unit DUH in case the content of the display register DRH is all zero. Also there are provided AND gates G2H and G3H receiving control signal from the control terminal CT3H, whereby a display for example "0" is shown when there are no data in the operation unit CUH while a display for example "-" is shown where there are no data in the memory MEMH, thus making a distinction between these two states.

Naturally and data present in the display register DRH cause the flip-flop FH to be set and thus are displayed on the display unit DUH through the AND gate G4H and decoder DDE.

Although in the foregoing embodiment the display is given also for an empty address in the memory MEMH, it is also possible to obtain the display only for occupied addresses in the first memory portion m1H if there is provided a comparing circuit which is actuated by the key CHECK to activate the step increasing circuit INCH for an empty address thereby advancing the content of the counter CNTH accordingly.

As explained in the foregoing, the present invention allows to select two different functions of the electronic apparatus by function mode switching.

What we claim is:

1. An information processing apparatus comprising:
   input means for entering information and retrieval instructions;
   storage means for storing data items each consisting of address information entered as memory addresses and data information associated with the address information, respectively;
   first retrieving means connected to said input means and said storage means for retrieving the data item stored in said storage means in such a way that it retrieves the address information coincident with a retrieving address information entered from said input means to derive the data information associated with the retrieved address information;
   second retrieving means connected to said input means and said storage means for retrieving the data item stored in said storage means in such a way that when said first retrieving means did not retrieve the stored address information coincident with a retrieving address information entered from said input means, it retrieves the stored address information most near the retrieving address information entered from said input means and derives the data information associated with the retrieved address information; and
   means for visualizing the data information derived from said first or second retrieving means.

2. An electronic apparatus having memorandum means, comprising:
   A. input means including a keyboard for entering numerical information, arithmetic instructions, and address information into said apparatus;
   B. memorandum means including
      (1) storage means for storing data items each consisting of address information entered as memory addresses and numerical information associated with the address information, respectively;

(2) first control means for controlling said storage means to store the data items entered from said input means; and (3) second control means responsive to address information entered from said input means for reading out the numerical information associated with the address information from said storage means;

C. calculating means connected to said input means and said memorandum means for performing arithmetic calculations on the numerical information read out by said second control means and for generating numeral information relating to said arithmetic calculations; and D. arithmetic control means coupled with said input means and said calculating means for causing said calculating means to perform an arithmetic operation on the numerical information read out from said memorandum means in accordance with an arithmetic instruction entered from said input means.

3. An electronic apparatus according to claim 1 wherein said calculating means includes a register for storing the numerical information.

4. An electronic apparatus according to claim 1 further comprising a display for visualizing the numerical information stored in said register.

5. An electronic apparatus according to claim 1 wherein said input means further includes a plurality of character keys for entering said address information.

* * * * *

UNITED STATES PATENT AND TRADEMARK OFFICE
CERTIFICATE OF CORRECTION

PATENT NO. : 4,402,056

DATED : August 30, 1983

INVENTOR(S) : ICHIRO SADO, ET AL.

It is certified that error appears in the above-identified patent and that said Letters Patent is hereby corrected as shown below:

Column 1

Line 65, change "afterwords" to --afterwards--.

Line 68, change "structue" to --structure--.

Column 5

Line 27, change "ClA" to --GlA--.

Column 7

Line 64, change "etrieve" to --retrieve--.

Column 10

Line 60, between "functions" and "same", insert --the--.

Lines 61-62, change "calculators" to --calculator--.

Line 63, between "actuation" and "a", insert --of--.

Column 13

Line 11, change "in" to --to--.

Line 21, between "numeral" and "portion" insert --memory--.

Line 63, change "as" to --at--.

UNITED STATES PATENT AND TRADEMARK OFFICE
CERTIFICATE OF CORRECTION

PATENT NO. : 4,402,056                  Page 2 of 3

DATED     : August 30, 1983

INVENTOR(S) : ICHIRO SADO, ET AL.

It is certified that error appears in the above-identified patent and that said Letters Patent is hereby corrected as shown below:

<u>Column 14</u>

Line 1, change "erase" to --erases--.

Line 55, change "nd" to --and--.

Line 57, between "write-in" and "WE", insert --key--.

Line 58, change "control" to --central--.

<u>Column 15</u>

Line 18, change "displayed" to --displays it--.

<u>Column 17</u>

Line 17, change "lowr" to --lower--.

<u>Column 23</u>

Line 36, change "stop" to --step--.

<u>Column 24</u>

Line 14, change "and" to --the--.

<u>Column 26, line 6</u>
<u>(Claim 3, line 1)</u>

Change "1" to --2--.

UNITED STATES PATENT AND TRADEMARK OFFICE
CERTIFICATE OF CORRECTION

PATENT NO. : 4,402,056

DATED : August 30, 1983

INVENTOR(S) : ICHIRO SADO, ET AL.

It is certified that error appears in the above-identified patent and that said Letters Patent is hereby corrected as shown below:

Column 26, line 9
(Claim 4, line 1)

Change "1" to --3--.

Claim 26, line 12
(Claim 5, line 1)

Change "1" to --2--.

Signed and Sealed this

Twenty-first Day of February 1984

[SEAL]

Attest:

GERALD J. MOSSINGHOFF

Attesting Officer    Commissioner of Patents and Trademarks